United States Patent
Deng et al.

(10) Patent No.: US 10,346,780 B2
(45) Date of Patent: Jul. 9, 2019

(54) EXTRACTION OF SYSTEM ADMINISTRATOR ACTIONS TO A WORKFLOW PROVIDING A RESOLUTION TO A SYSTEM ISSUE

(71) Applicant: International Business Machines Corporation, Armonk, NY (US)

(72) Inventors: Yu Deng, Yorktown Heights, NY (US); Ruchi Mahindru, Elmsford, NY (US); Lakshminarayanan Renganarayana, San Jose, CA (US); Soumitra Sarkar, Cary, NC (US); Long Wang, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 706 days.

(21) Appl. No.: 14/609,457

(22) Filed: Jan. 30, 2015

(65) Prior Publication Data
US 2016/0224910 A1     Aug. 4, 2016

(51) Int. Cl.
G06Q 10/06     (2012.01)
G06Q 30/00     (2012.01)

(52) U.S. Cl.
CPC ....... G06Q 10/0633 (2013.01); G06Q 30/016 (2013.01)

(58) Field of Classification Search
CPC ........... G06Q 10/0633; G06Q 10/0631; G06Q 30/016; G06F 9/46
See application file for complete search history.

(56) References Cited

U.S. PATENT DOCUMENTS 6,697,973 B1 * 2/2004 Baumeister, IV .. G06F 11/0721
                                                      714/23
6,985,872 B2 * 1/2006 Benbassat .............. G06Q 10/06
                                                      705/7.14
(Continued)

FOREIGN PATENT DOCUMENTS

CN     101021810 A     8/2007
CN     105843703 A     8/2016

OTHER PUBLICATIONS

Pending U.S. Appl. No. 14/492,666, filed Sep. 22, 2014, entitled "Creating Knowledge Base of Similar Systems From Plurality of Systems."

(Continued)

*Primary Examiner* — Matthew S Gart
*Assistant Examiner* — Stephen S Swartz
(74) *Attorney, Agent, or Firm* — Michael O'Keefe

(57) ABSTRACT

A method for creating a workflow using system administrator actions to resolve a system issue is provided. The method may include assigning a ticket to a category. The method may include capturing a first snapshot of a first system state of a machine before a system administrator begins a corrective action. The method may include capturing a second snapshot of a second system state of the machine after system administrator corrective action. The method may include creating a difference set based on a comparison of the first snapshot and the second snapshot. The method may include generating summaries of administrator action. The method may include dividing the summaries into groups of summaries. The method may include constructing a candidate workflow for each group. The method may include presenting the candidate workflow to a subject matter expert. The method may include storing the reviewed candidate workflow in a repository.

11 Claims, 6 Drawing Sheets

(56) References Cited

U.S. PATENT DOCUMENTS

| | | | |
|---|---|---|---|
| 7,757,124 B1* | 7/2010 | Singh | G06F 11/26 714/32 |
| 7,934,229 B1* | 4/2011 | Vogel | G06F 21/568 725/24 |
| 8,136,163 B2 | 3/2012 | Birt et al. | |
| 8,200,527 B1* | 6/2012 | Thompson | G06Q 10/0639 705/7.38 |
| 8,214,906 B2 | 7/2012 | Goddard | |
| 9,646,275 B2* | 5/2017 | Nielsen | G06Q 10/06 |
| 9,684,553 B2* | 6/2017 | Klein | G06F 11/0766 |
| 2002/0120554 A1* | 8/2002 | Vega | G06Q 20/10 705/37 |
| 2005/0125450 A1* | 6/2005 | Wong | A47H 27/00 |
| 2006/0195564 A1* | 8/2006 | Accardi | G06F 19/327 709/223 |
| 2009/0183070 A1* | 7/2009 | Robbins | H04B 1/202 715/702 |
| 2011/0009991 A1* | 1/2011 | Dinicola | G06F 21/10 700/97 |
| 2011/0022433 A1* | 1/2011 | Nielsen | G06Q 10/06 705/7.27 |
| 2012/0265573 A1* | 10/2012 | Van Pelt | G06Q 10/063114 705/7.14 |
| 2013/0035920 A1* | 2/2013 | Al-Shammari | E21B 43/12 703/10 |
| 2013/0198116 A1 | 8/2013 | Bhamidipaty et al. | |
| 2013/0347003 A1* | 12/2013 | Whitmore | G06Q 10/06 718/108 |
| 2014/0129536 A1 | 5/2014 | Anand et al. | |
| 2016/0104125 A1* | 4/2016 | Chapman | G06Q 10/20 705/305 |
| 2016/0124821 A1* | 5/2016 | Klein | G06F 11/0766 714/4.4 |
| 2016/0164722 A1* | 6/2016 | Zhu | H04L 41/082 709/221 |

OTHER PUBLICATIONS

Mell et al., "The NIST Definition of Cloud Computing," National Institute of Standards and Technology, Information Technology Lab, Version 15, Oct. 7, 2009.

* cited by examiner

EXTRACTION OF SYSTEM ADMINISTRATOR ACTIONS TO A WORKFLOW PROVIDING A RESOLUTION TO A SYSTEM ISSUE

FIELD OF INVENTION

The present invention relates generally to the field of computing, and more particularly to system administrator resolution of help desk tickets.

BACKGROUND

A help desk is a service providing a form of troubleshooting through the submission of tickets detailing a particular system issue. A ticket is a standard information technology (IT) management artifact for tracking a customer problem or issue. Upon reviewing a submitted ticket, a system administrator may browse a knowledge base of action plans in order to designate the most appropriate action plan to aid in resolving the current system issue. An action plan is a document containing manually curated knowledge from a subject matter expert that may provide guidance to resolve a system issue. The creation of action plans may be a tedious, manual process requiring the involvement of subject matter experts or domain experts. Since many help desk administrators may be busy resolving help desk tickets and satisfying other standard help desk demands, domain experts and subject matter experts may not have adequate time to create knowledge base entries of action plans for well-understood problems.

SUMMARY

According to one embodiment, a method for creating an idealized, reusable workflow by analyzing system administrator actions to resolve a system issue is provided. The method may include assigning a ticket to a category based on the system issue, wherein the system issue is tracked with the ticket. The method may also include capturing a first snapshot of a first system state associated with a machine before a system administrator begins a corrective action on the machine. The method may further include capturing a second snapshot of a second system state associated with the machine after the system administrator completes the corrective action on the machine. The method may also include creating a difference set based on a comparison of the first snapshot of the first system state and the second snapshot of the second system state. The method may include generating summaries of administrator actions performed for each system issue resolution representing changes made during the two snapshots, wherein each summary is based on the difference set and commands captured in the command history file that were issued by the administrator to affect the state changes computed between the two snapshots. The method may also include dividing the summaries into groups of summaries based on similarities. The method may further include constructing a candidate workflow for each group. The method may include presenting the candidate workflow to a subject matter expert for review. The method may also include storing the reviewed action plan as an authorized action plan in a repository.

According to another embodiment, a computer system for creating an idealized, reusable workflow by analyzing system administrator actions to resolve a system issue is provided. The computer system includes one or more processors, one or more computer-readable memories, one or more computer-readable tangible storage medium, and program instructions stored on at least one of the one or more tangible storage medium for execution by at least one of the one or more processors via at least one of the one or more memories, where the computer system is capable of performing a method. The computer system may include assigning a ticket to a category based on the system issue, wherein the system issue is tracked with the ticket. The computer system may also include capturing a first snapshot of a first system state associated with a machine before a system administrator begins a corrective action on the machine. The computer system may further include capturing a second snapshot of a second system state associated with the machine after the system administrator completes the corrective action on the machine. The computer system may also include creating a difference set based on a comparison of the first snapshot of the first system state and the second snapshot of the second system state. The computer system may include generating summaries of administrator actions performed for each system issue resolution representing changes made during the two snapshots, wherein each summary is based on the difference set and commands captured in the command history file that were issued by the administrator to affect the state changes computed between the two snapshots. The computer system may also include dividing the summaries into groups of summaries based on similarities. The computer system may further include constructing a candidate workflow for each group. The computer system may include presenting the candidate workflow to a subject matter expert for review. The computer system may also include storing the reviewed action plan as an authorized action plan in a repository.

According to yet another embodiment, a computer program product for creating an idealized, reusable workflow by analyzing system administrator actions to resolve a system issue is provided. The computer program product includes one or more computer-readable tangible storage medium and program instructions stored on at least one of the one or more tangible storage medium, the program instructions executable by a processor. The computer program product may include instructions to assign a ticket to a category based on the system issue, wherein the system issue is tracked with the ticket. The computer program product may include instructions to capture a first snapshot of a first system state associated with a machine before a system administrator begins a corrective action on the machine. The computer program product may include instructions to capture a second snapshot of a second system state associated with the machine after the system administrator completes the corrective action on the machine. The computer program product may include instructions to create a difference set based on a comparison of the first snapshot of the first system state and the second snapshot of the second system state. The computer program product may include instructions to generate summaries of administrator actions performed for each system issue resolution representing changes made during the two snapshots, wherein each summary is based on the difference set and commands captured in the command history file that were issued by the administrator to affect the state changes computed between the two snapshots. The computer program product may include instructions to divide the summaries into groups of summaries based on similarities. The computer program product may include instructions to construct a candidate workflow for each group. The computer program product may include instructions to present the candidate workflow to a subject matter expert for review. The computer program product may include instructions to store the reviewed action plan as an authorized action plan in a repository.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Figure 1:
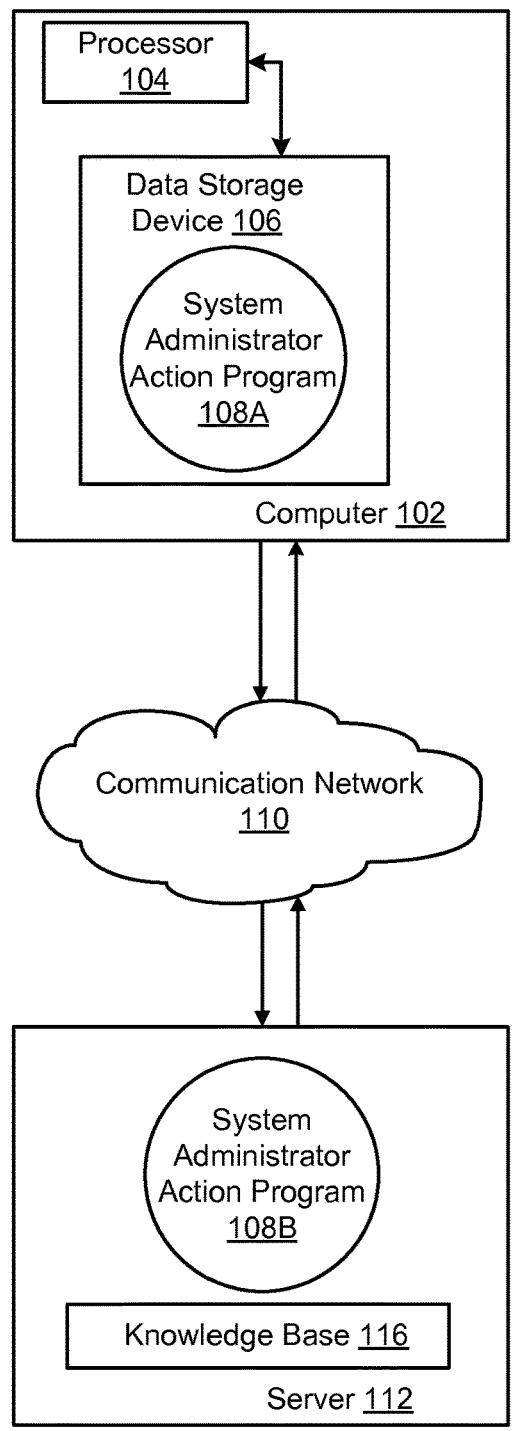
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate to the field of computing, and more particularly to system administrator resolution of help desk tickets. The following described exemplary embodiments provide a system, method, and program product to, among other things, extract best-practice system administrator actions in order to assist other system administrators in providing a resolution to a similar help desk ticket quicker and more effectively. Additionally, the present embodiment has the capacity to improve the technical field of system administrator resolution of help desk tickets by using automated machine-level analysis to determine a standardized workflow to correct a known system issue.

As previously described, upon reviewing a submitted ticket, a system administrator may browse a library of action plans in order to select the most appropriate action plan to aid in resolving the current system issue. Action plans provide guidance to system administrators by outlining specific workflow steps and commands that may be taken to resolve a system issue. The creation of action plans may be a tedious, manual process requiring the involvement of a subject matter expert (SME) or a domain expert. Since many SMEs and domain experts may be busy resolving help desk tickets and satisfying other standard help desk demands, adequate time to create knowledge base entries of action plans for well-understood problems may not be available. Identifying a best-practice action plan may require significant manual effort from an SME to identify patterns of solutions applied to known problems to define a set of best-practice workflows (e.g. solutions or action plans) for a given type of problem. Machine snapshot difference computations along with analysis techniques, such as n-gram analysis, may make the process of identifying best-practice action plans for a known problem semi-automated. Semi-automation may not require dedicated SME involvement and, therefore, may result in much faster ticket resolution than fully manual techniques. As such, it may be advantageous, among other things, to identify the system administrator actions that best resolve particular system issues and summarize the system administrator actions into a workflow.

According to one implementation, the present embodiment may provide a method to extract previous system administrator actions in order to create candidate workflows which can provide guidance when resolving a system issue. As such, the present embodiment may allow the most suitable workflow to be presented to a system administrator based on the category of the system issue. Therefore, a library of workflows may be created without significant manual effort from SMEs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The following described exemplary embodiments provide a system, method and program product to extract previous system administrator actions in order to create candidate, best-practice workflows for a given type of information technology (IT) system problem, which can be used to resolve a future problem ticket associated with a similar system issue. According to at least one implementation, a ticket may be associated with a problem of a given type or category. Thereafter, a snapshot of the machine may be captured both before and after administrator action is taken. Then, a difference set may be created through comparison of the snapshot taken after administrator action to the snapshot taken before administrator action to determine the system administrator changes that affected the system state. Furthermore, a trustworthiness score may be assigned to the difference set. Thereafter, once a sufficient number of difference set results are gathered for a particular category of tickets, a summary of administrator actions for each ticket in the category may be generated. Then, the summaries of administrator actions may be grouped together into a cluster based on similarity of the administrator actions. Thereafter, a candidate workflow may be created using the individual summaries of administrator actions, computed on all summaries belonging to a group (e.g. cluster). Furthermore, the candidate workflow may be reviewed by an expert administrator. Then, the reviewed workflow may be stored in a knowledge base.

Referring now to FIG. 1, an exemplary networked computer environment 100 in accordance with one embodiment is depicted. The networked computer environment 100 may include a computer 102 with a processor 104 and a data storage device 106 that is enabled to run a System Administrator Action Program 108A. The networked computer environment 100 may also include a server 112 that is enabled to run a System Administrator Action Program 108B and a communication network 110. The networked computer environment 100 may include a plurality of computers 102 and servers 112, only one of which is shown for illustrative brevity. According to at least one implementation, the present embodiment may also include a repository, such as a knowledge base 116, which may be running on server 112. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

According to the present embodiment, a program, such as a System Administrator Action Program 108A and 108B may run on the client computer 102 or on the server computer 112. The System Administrator Action Program 108A, 108B may extract system administrator actions, summarize the system administrator actions into a workflow, and present the workflow to a user. The System Administrator Action method is explained in further detail below with respect to FIG. 2.

Figure 2:
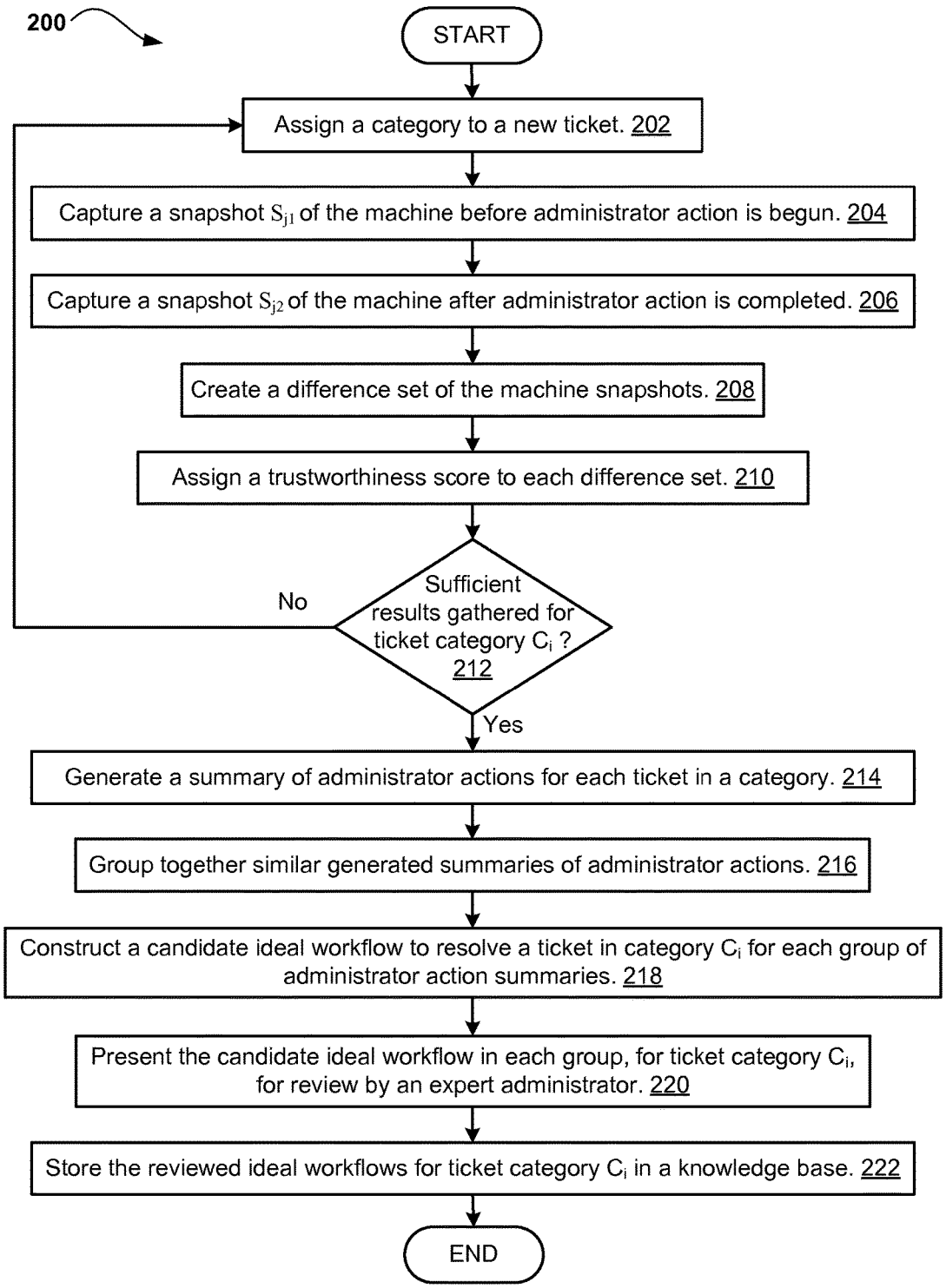
FIG. 2 is an operational flow chart illustrating the steps carried out by a program to extract system administrator actions in response to troubleshooting tickets of different categories.

FIG. 2, an operational flowchart 200 illustrating the process that is triggered when a new problem ticket is created, consisting of steps carried out by the System Administrator Action Program 108A, 108B (FIG. 1) to extract system administrator actions performed to resolve the ticket, summarize similar system administrator actions into a workflow when sufficient number of tickets for a similar problem have been resolved, present the workflow to the system administrator for review, and store the reviewed workflow in a knowledge base for future use. At 202 within the System Administrator Action Program 108A, 108B (FIG. 1), a category $C_i$ may be assigned to a new ticket, based on the problem associated with the ticket. As previously described, a ticket may be created by or on behalf of a user to a help desk in response to a system issue. Thereafter, each ticket may be categorized according to the specific system issue that instigated the submission of the ticket. For example, when a ticket is submitted to the help desk with the system issue listed as "hard disk full," the System Administrator Action Program 108A, 108B (FIG. 1) may assign that help desk ticket to a category $C_i$ titled "file system out of space." Assignment of a problem category $C_i$ to a ticket may be completed manually by a human dispatcher or automatically using text-analysis techniques.

Next at 204, the System Administrator Action Program 108A, 108B (FIG. 1) may capture a snapshot $S_{j1}$ of the state of the machine before a system administrator begins taking corrective action on the system. The snapshot $S_{j1}$ taken by the System Administrator Action Program 108A, 108B (FIG. 1) may be a snapshot of a physical machine, such as a server, or a virtual machine (VM). The System Administrator Action Program 108A, 108B (FIG. 1) may utilize a data center analytics platform, such as IBM's® Origami System, to capture the current system state before the system administrator takes any action to correct the system issue. Furthermore, the snapshot $S_{j1}$ taken by the data center analytics platform may include files stored on the system, processes currently operating on the system, the system configuration entries, packages contained on the system, established network connections, and ports open on the system.

Next at 206, the System Administrator Action Program 108A, 108B (FIG. 1) may capture a snapshot $S_{j2}$ of the state of the machine after the system administrator completes corrective action on the system. For example, the snapshot $S_{j2}$ may be captured when a system administrator closes a ticket. Similar to step 204, the snapshot $S_{j2}$ taken by the System Administrator Action Program 108A, 108B (FIG. 1) may be a snapshot of a physical machine, such as a server, or a VM. Also similar to step 204, the System Administrator Action Program 108A, 108B (FIG. 1) may utilize the data center analytics platform to determine the state of the system after the system administrator action is complete. Furthermore, the snapshot $S_{j2}$ may include files stored on the system, processes currently operating on the system, the system configuration entries, packages contained on the system, established network connections, and ports open on the system.

Next at 208, the System Administrator Action Program 108A, 108B (FIG. 1) may utilize the data center analytics platform to create a difference set of the machine by comparing the snapshot $S_{j1}$ taken before the start of system administrator action and the snapshot $S_{j2}$ taken after the completion of system administrator action. Using the data center analytics platform, the snapshot $S_{j1}$ and the snapshot $S_{j2}$ may be compared to create the difference set $S_{j2}-S_{j1}$ of the machine resulting from the system administrator actions. Therefore, the difference set may show the difference in the state of the machine before system administrator action and after system administrator action. For example, the snapshot $S_{j1}$ of the machine before system administrator action may show the presence of a file. The snapshot $S_{j2}$ of the machine after system administrator action may no longer show the presence of the file. Therefore, the difference set $S_{j2}-S_{j1}$ may show the file as being removed since the file is present in snapshot $S_{j1}$ but not present in snapshot $S_{j2}$. Additionally, the difference set $S_{j2}-S_{j1}$ may include the changes implemented in a command history file between the first snapshot $S_{j1}$ and the second snapshot $S_{j2}$.

Next at 210, the System Administrator Action Program 108A, 108B (FIG. 1) may assign a trustworthiness score to each difference set $S_{j2}-S_{j1}$. A trustworthiness score may be a rating of the difference set $S_{j2}-S_{j1}$ based on the experience and training of the system administrator that performed corrective action for the ticket. Furthermore, a higher trustworthiness score may be assigned to a difference set $S_{j2}-S_{j1}$ where a more experienced system administrator performed the corrective action. Similarly, a lower trustworthiness score may be assigned to a difference set $S_{j2}-S_{j1}$ where a less experienced system administrator performed the corrective action. For example, if System Administrator A previously provided corrective action on 2,000 help desk tickets and System Administrator B provided corrective action on 200 help desk tickets, a difference set $S_{j2}-S_{j1}$ corresponding to corrective actions taken by System Administrator A may receive a higher trustworthiness score than a difference set $S_{j2}-S_{j1}$ corresponding to corrective actions taken by System Administrator B since System Administrator A previously provided corrective action on 1,800 more help desk tickets than System Administrator B. However, an experienced system administrator may encounter a new type of system issue or a new scenario within a problem category. Since experience and education may not aid the system administrator in resolving the new type of system issue or new scenario within a problem category, the trustworthiness score associated with that particular system administrator may not be negatively affected for the new type of system issue or new scenario within a problem category. Furthermore, the trustworthiness score may relate to the accurateness of the corrective action taken by the system administrator. For example, if a resolved ticket is subsequently reopened due to the system issue reoccurring, a lower trustworthiness score may be assigned to the corresponding difference set $S_{j2}-S_{j1}$ since the system administrator actions did not fully resolve the system issue. Therefore, a difference set $S_{j2}-S_{j1}$ with a high trustworthiness score may provide a better set of corrective actions to a particular system issue.

Then at 212, it may be determined whether the method has gathered sufficient results in terms of the number of tickets resolved for a given category. According to one implementation, the method may continue along the operational flowchart 200, if sufficient results have been gathered. If at 212, sufficient results have been gathered, then the method may advance to step 214. However, if at 212, sufficient results have not been gathered, then the method may continue back to step 202, to await a new problem ticket to be opened that is assigned a category $C_i$ as previously described.

Next at 214, once sufficient difference sets $S_{j2}-S_{j1}$ for a category $C_i$ are gathered the System Administrator Action Program 108A, 108B (FIG. 1) may generate a summary of administrator actions for each ticket in a category $C_i$ using the difference sets $S_{j2}-S_{j1}$ and command history files. A summary of administrator actions may be an interleaved-in-time representation of a sequence of system administrator actions and the resulting state change on the system. As previously described, a difference set $S_{j2}-S_{j1}$ may document the state change in the machine between snapshot $S_{j1}$ taken before system administrator action and snapshot $S_{j2}$ taken after system administrator action. Additionally, command history files may document the commands the system administrator may have utilized while performing corrective action on the ticket. As previously described in step 208, the difference set $S_{j2}-S_{j1}$ may include the changes implemented in a command history file between the first snapshot $S_{j1}$ and the second snapshot $S_{j2}$. In creating the summary of administrator actions, the System Administrator Action Program 108A, 108B (FIG. 1) may interleave the commands gathered from the command history files with the state changes gathered from the difference set $S_{j2}-S_{j1}$. Therefore, a summary of administrator actions may illustrate a particular command the system administrator may have implemented subsequently followed by the system state change that may have resulted from that particular command. For example, when a system administrator is performing corrective action on a ticket containing the error message "file system out of space," the System Administrator Action Program 108A, 108B (FIG. 1) may analyze the command history file, which may be timestamped, and the difference set $S_{j2}-S_{j1}$ to determine the commands implemented and the resulting system state changes used by the system administrator to make system space available. If the system administrator attempted to free up system space by deleting log files using the Unix® (Unix® and all Unix-based trademarks and logos are trademarks or registered trademarks of The Open Group and/or its affiliates) remove command (i.e. rm), the System Administrator Action Program 108A, 108B (FIG. 1) may generate a summary of administrator actions by recognizing the Unix remove command from the command history files followed by the resulting state change of file deletion in the difference set $S_{j2}-S_{j1}$.

Next at 216, the System Administrator Action Program 108A, 108B (FIG. 1) may group together similar summaries of administrator actions. Upon completion of step 214, the System Administrator Action Program 108A, 108B (FIG. 1) may have a number of summaries of administrator actions that may delineate the steps a system administrator may have used to resolve a system issue. The System Administrator Action Program 108A, 108B (FIG. 1) may group together summaries of administrator actions that follow similar approaches to solve similar tickets in a category $C_i$. For example, a first solution to a system issue in the category "file system out of space" may be to remove files and processes from the system. However, a second solution to the same system error in the category "file system out of space" may be to add new storage space to the system (e.g. requisitioning a larger hard disk drive). Since each solution provides a different means (i.e. making storage space available) to solving the same system issue, summaries of administrator actions implementing the first solution may be grouped together and summaries of administrator actions implementing the second solution may be grouped together. Additionally, the System Administrator Action Program 108A, 108B (FIG. 1) may perform the grouping by representing each summary as an ordered vector of actions and state changes. Furthermore, subsequent adaptations of clustering algorithms, which may be based on applying similarity measures between a pair of unordered vectors to determine groupings, may be used for clustering system administrator action summaries.

Next at 218, the System Administrator Action Program 108A, 108B (FIG. 1) may construct a candidate workflow (e.g. action plan) to resolve a ticket in category $C_i$ using the grouped summaries of administrator actions. Once similar summaries of administrator actions have been grouped together, the System Administrator Action Program 108A, 108B (FIG. 1) may apply text summarization techniques, such as n-gram analysis, to construct a candidate workflow. The candidate workflow generated may be the preferred process by which a system administrator should resolve a ticket in category $C_i$. Furthermore, while analyzing the grouped summaries of administrator actions, the System Administrator Action Program 108A, 108B (FIG. 1) may give more weight to summaries of administrator actions generated using a difference set $S_{j2}-S_{j1}$ with a higher trustworthiness score than to summaries of administrator actions generated using a difference set $S_{j2}-S_{j1}$ with a lower trustworthiness score. Additionally, steps within summaries of administrator actions implemented in a large number of summaries of administrator actions may be given more weight when constructing a candidate workflow, since steps performed by many system administrators may be more reliable than steps performed by only a few system administrators. For example, if the System Administrator Action Program 108A, 108B (FIG. 1) groups 250 summaries of administrator actions together in step 216, a candidate workflow may be constructed using the 250 summaries of administrator actions. The System Administrator Action Program 108A, 108B (FIG. 1) may recognize a particular step causing a given state change in the server was implemented in 240 of the 250 summaries of administrator actions. Since that particular step was implemented in the vast majority of the summaries of administrator actions, the System Administrator Action Program 108A, 108B (FIG. 1) may include that step in the candidate workflow. However, if a second step is implemented in 10 of the 250 summaries of administrator actions, the second step may not be included in the candidate workflow, since it was not implemented in many summaries of administrator actions and, therefore, may not be reliable in solving the system issue. Additionally, the System Administrator Action Program 108A, 108B (FIG. 1) may apply text summarization techniques, such as n-gram analysis, for each action-state pair (i.e. a system administrator action and the corresponding state change affected). Furthermore, each n number of consecutive pairs may be treated as an n-gram. For example, two consecutive action-state pairs may be treated as a 2-gram and three consecutive action-state pairs may be treated as a 3-gram. Identifying distinct n-grams in a single group or cluster of system administrator action summaries and identifying the most frequently occurring n-grams as important atomic-steps in the field of IT systems management that may assist with creating accurate idealized workflows to be presented for review. Furthermore, the order of the set of steps within each summary of administrator actions may be accounted for when constructing the constructed candidate workflow, since text summarization techniques may not account for order when performing an analysis.

Next at 220, the System Administrator Action Program 108A, 108B (FIG. 1) may present the candidate workflow to an SME for review. Since some text summarization techniques, adopted for a domain, may not present the candidate workflow steps in the correct sequential order, the candidate workflow may need to be reviewed by a subject matter expert. Therefore, the subject matter expert may be presented with the candidate workflow to review the candidate workflow for errors and omissions. For example, the System Administrator Action Program 108A, 108B (FIG. 1) may generate a five-step candidate workflow in step 218 with steps listed from first through fifth. However, the System Administrator Action Program 108A, 108B (FIG. 1) may erroneously superimpose the second and third steps of the candidate workflow. Therefore, the subject matter expert may need to review the candidate workflow in order to correct the erroneously superimposed second and third steps.

Next at 222, the System Administrator Action Program 108A, 108B (FIG. 1) may store the reviewed workflow for ticket category $C_i$ in a repository, such as a knowledge base. Once the subject matter expert reviews and, if necessary, edits the candidate workflow, the reviewed workflow may be stored in a knowledge base for future access by system administrators in order to resolve problem tickets more quickly and accurately.

It may be appreciated that FIG. 2 provides only an illustration of one implementation and does not imply any limitations with regard to how different embodiments may be implemented. Many modifications to the depicted environments may be made based on design and implementation requirements. For example, as previously described, the present embodiment may be implemented in hardware via a graphics display adapter to apply to either a subset or complete screen coverage and may be made software selectable as needed.

Figure 3:
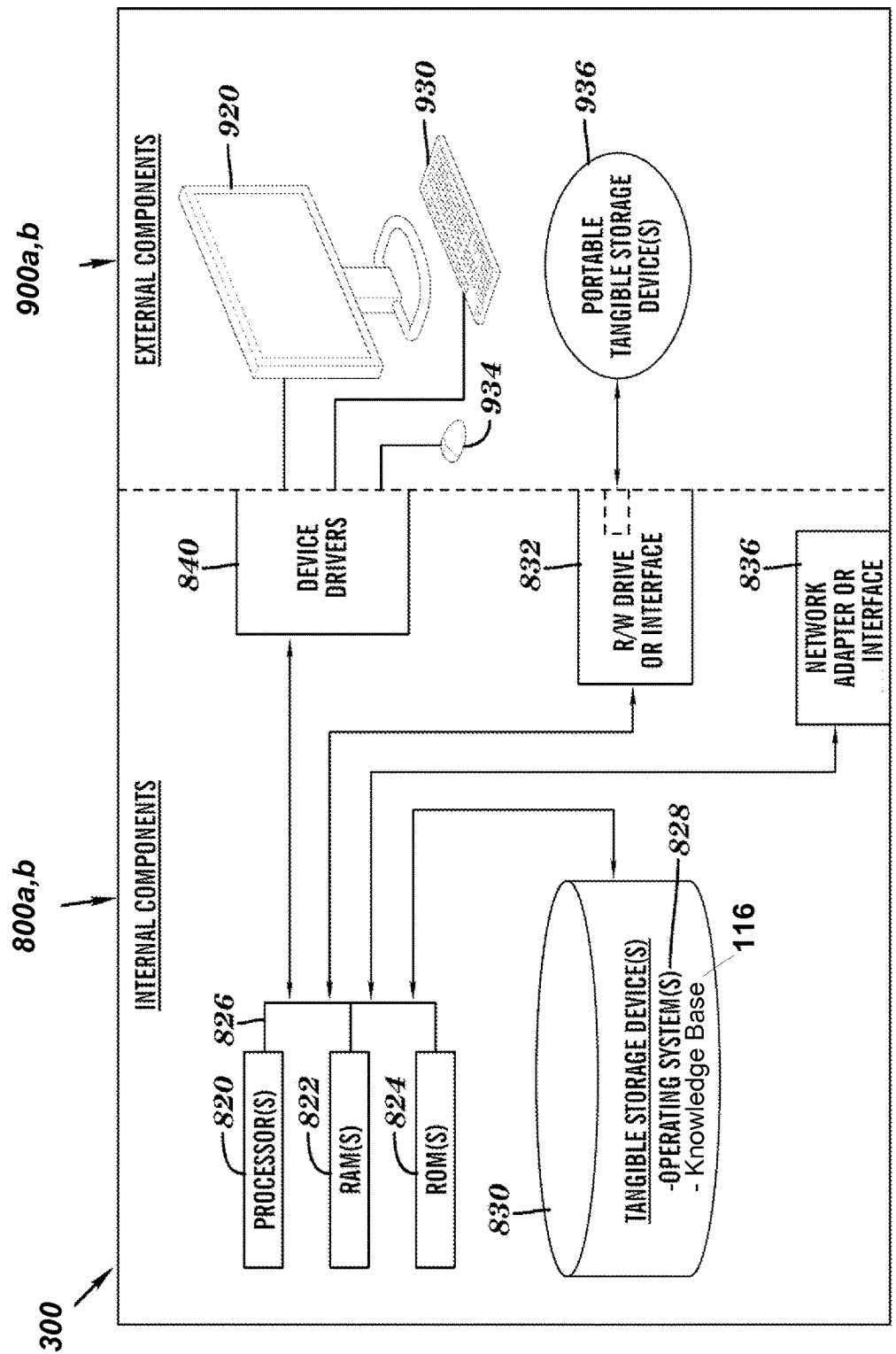
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800 a, b and external components 900 a, b illustrated in FIG. 3. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the System Administrator Action Program 108A (FIG. 1) in client computer 102 (FIG. 1) and the System Administrator Action Program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the System Administrator Action Program 108A (FIG. 1) and 108B (FIG. 1), can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The System Administrator Action Program 108A (FIG. 1) in client computer 102 (FIG. 1) and System Administrator Action Program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the System Administrator Action Program 108A (FIG. 1) in client computer 102 (FIG. 1) and the System Administrator Action Program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Figure 4:
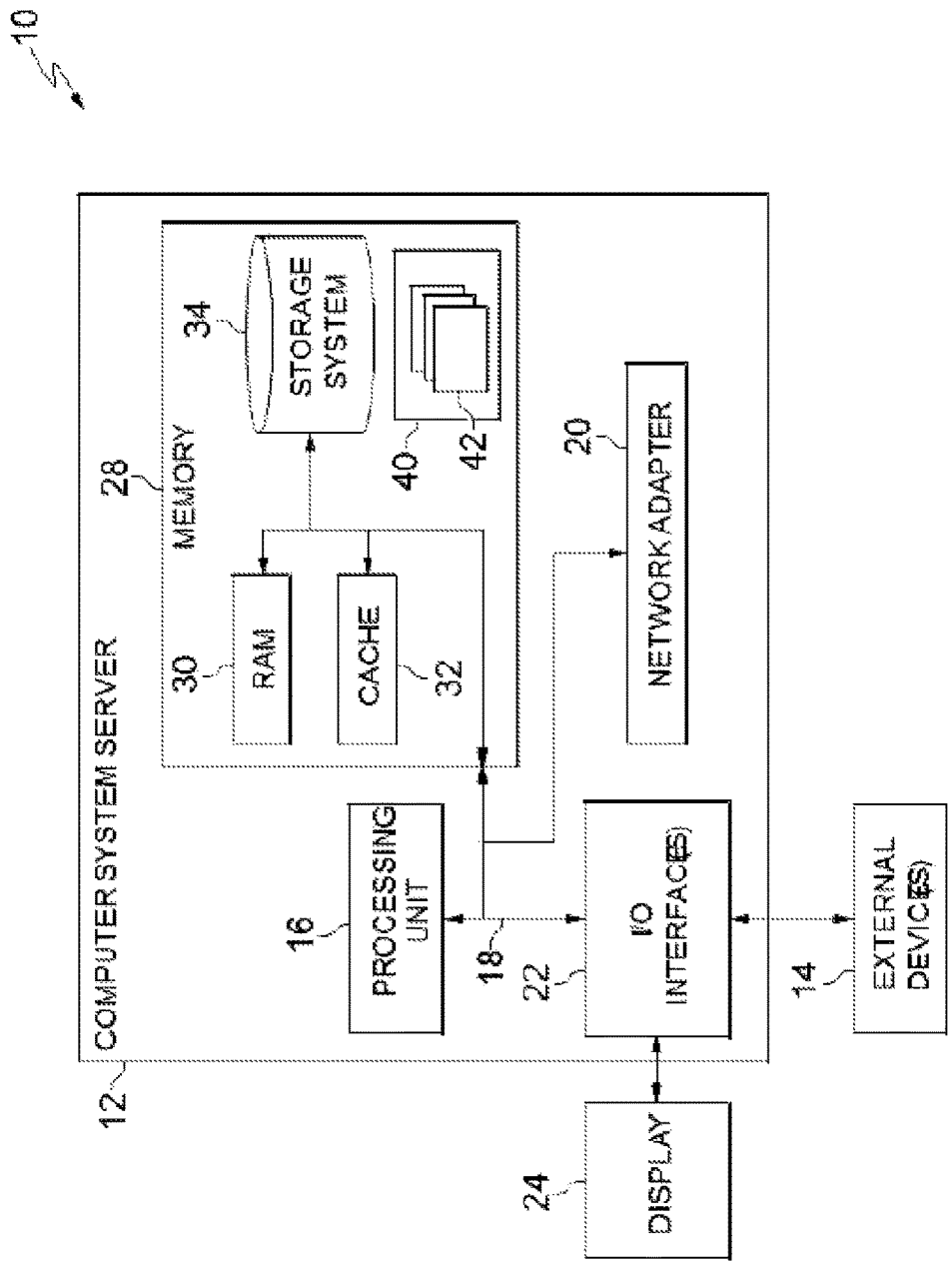
FIG. 4 depicts a cloud computing node according to an embodiment of the present invention.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
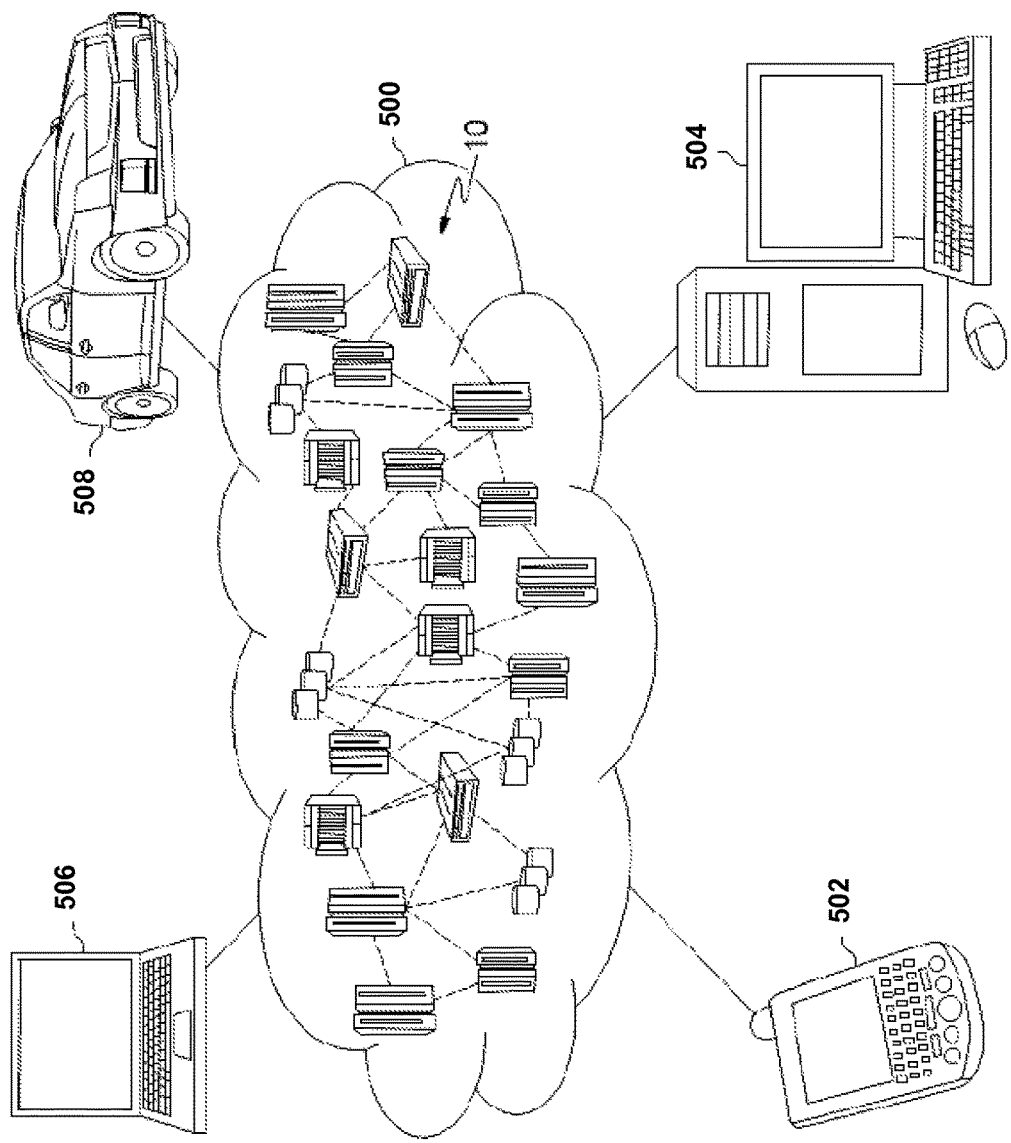
FIG. 5 depicts a cloud computing environment according to an embodiment of the present invention.

Referring now to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 502, desktop computer 504, laptop computer 506, and/or automobile computer system 508 may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 502, 504, 506, and 508 shown in FIG. 5 are intended to be illustrative only and that computing nodes 10 and cloud computing environment 500 can communicate with any type of computerized device over any type of network and/or network addressable connection (e.g., using a web browser).

Figure 6:
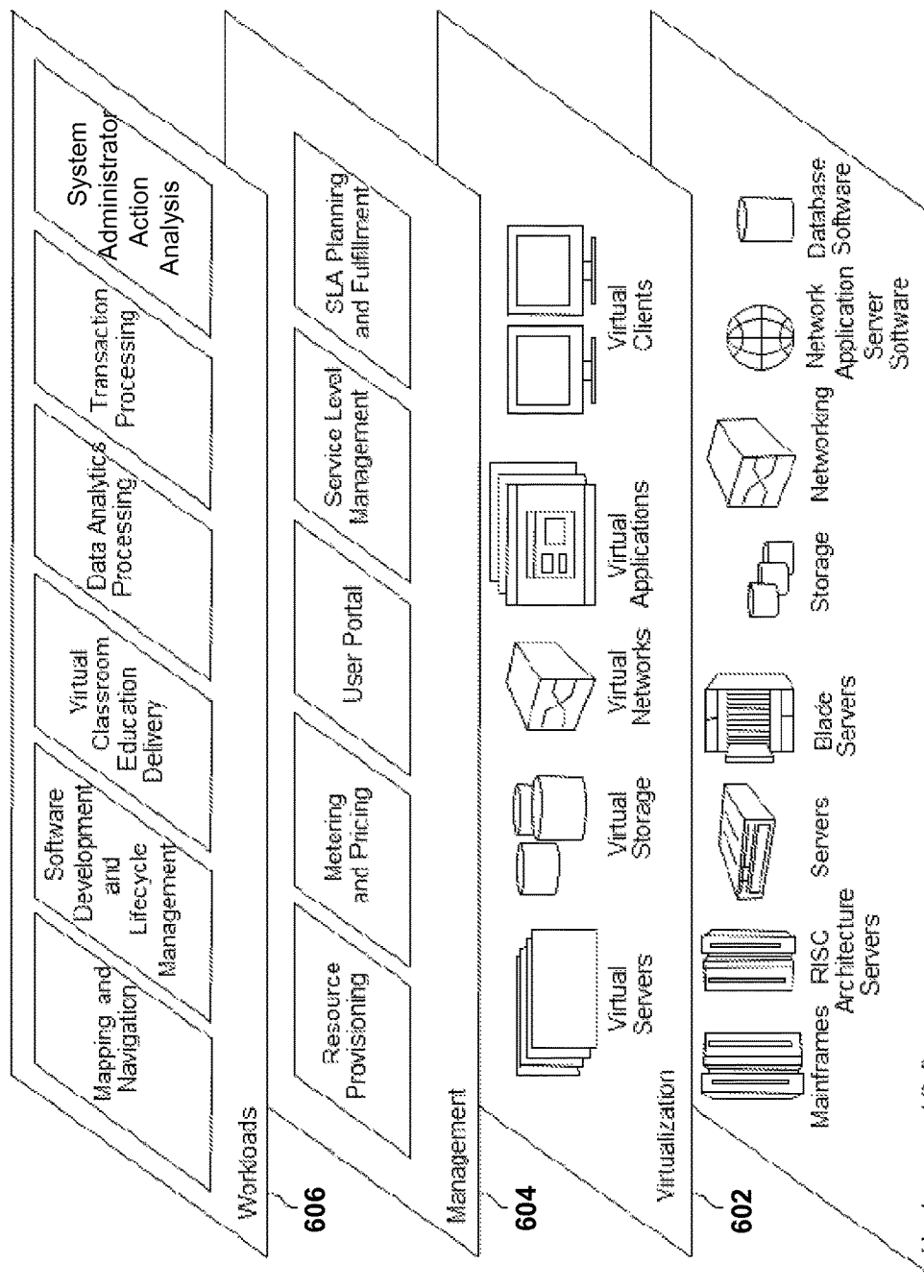
FIG. 6 depicts abstraction model layers according to an embodiment of the present invention.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 600 includes hardware and software components. Examples of hardware components include mainframes; RISC (Reduced Instruction Set Computer) architecture based servers; storage devices; networks and networking components. In some embodiments software components include network application server software.

Virtualization layer 602 provides an abstraction layer from which the following examples of virtual entities may be provided: virtual servers; virtual storage; virtual networks, including virtual private networks; virtual applications and operating systems; and virtual clients.

In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing, such as system administrator action extraction; transaction processing; and system administrator action analysis. System administrator action analysis relates to identifying the system administrator actions that best resolved particular system issues, summarize the system administrator actions into a workflow, and present the workflow when a system administrator begins handling a help desk ticket of the same category The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method for creating a workflow using a plurality of system administrator actions to resolve at least one system issue, the method comprising:
   assigning a plurality of tickets to at least one category based on the at least one system issue, wherein the at least one system issue is associated with each ticket;
   capturing a first snapshot of a first system state associated with each machine associated with each ticket before a system administrator begins a corrective action on each machine;
   capturing a second snapshot of a second system state associated with each machine after the system administrator completes the corrective action on each machine;
   creating a difference set for each ticket, simultaneously, based on a comparison of the first snapshot of the first system state and the second snapshot of the second system state;
   assigning a trustworthiness score to each difference set, wherein the trustworthiness score is based on a total number of tickets the system administrator previously resolved, a system administrator experience, a system administrator training, and a total number of tickets the system administrator previously resolved that were subsequently reopened due to reoccurrence of the at least one system issue;
   generating a plurality of summaries of at least one administrator action, simultaneously, wherein each summary is based on the difference set for each ticket and at least one command within at least one command history file and at least one state change caused by the at least one command, associated with each ticket in the at least one category;
   dividing the plurality of summaries into a plurality of groups of summaries;
   constructing a candidate workflow for each group within the plurality of groups, wherein constructing the candidate workflow utilizes n-gram analysis that accounts for an order of steps within each summary, and wherein the plurality of summaries that, during construction of the candidate workflow, more weight is given to summaries of administrator actions generated using a difference set with a higher trustworthiness score than to summaries of administrator actions generated using a difference set with a lower trustworthiness score, and wherein steps within summaries of administrator actions implemented in a large number of summaries of administrator actions are given more weight when constructing the candidate workflow that steps in a small number of summaries of administrator actions;
   generating a graphical user interface that displays the candidate workflow; and
   storing the candidate workflow in a repository.

2. The method of claim 1, wherein constructing the candidate workflow for each group within the plurality of groups wherein each summary within each group associated with a high trustworthiness score is given greater weight than each summary associated with a low trustworthiness score.

3. The method of claim 1, wherein dividing the plurality of summaries into the plurality of groups of summaries is based on a plurality of similar corrective actions implemented by the system administrator to resolve the ticket associated with each summary.

4. The method of claim 1, wherein when constructing the candidate workflow, more weight is given to the at least one administrator action implemented in a majority of summaries within the plurality of groups of summaries.

5. A computer system for creating a workflow using a plurality of system administrator actions to resolve at least one system issue, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   assigning a plurality of tickets to at least one category based on the at least one system issue, wherein the at least one system issue is associated with each ticket;
   capturing a first snapshot of a first system state associated with each machine associated with each ticket before a system administrator begins a corrective action on each machine;
   capturing a second snapshot of a second system state associated with each machine after the system administrator completes the corrective action on each machine;
   creating a difference set for each ticket, simultaneously, based on a comparison of the first snapshot of the first system state and the second snapshot of the second system state;
   assigning a trustworthiness score to each difference set, wherein the trustworthiness score is based on a total number of tickets the system administrator previously resolved, a system administrator experience, a system administrator training, and a total number of tickets the system administrator previously resolved that were subsequently reopened due to reoccurrence of the at least one system issue;

generating a plurality of summaries of at least one administrator action, simultaneously, wherein each summary is based on the difference set for each ticket and at least one command within at least one command history file and at least one state change caused by the at least one command, associated with each ticket in the at least one category;

dividing the plurality of summaries into a plurality of groups of summaries;

constructing a candidate workflow for each group within the plurality of groups, wherein constructing the candidate workflow utilizes n-gram analysis that accounts for an order of steps within each summary, and wherein the plurality of summaries that, during construction of the candidate workflow, more weight is given to summaries of administrator actions generated using a difference set with a higher trustworthiness score than to summaries of administrator actions generated using a difference set with a lower trustworthiness score, and wherein steps within summaries of administrator actions implemented in a large number of summaries of administrator actions are given more weight when constructing the candidate workflow that steps in a small number of summaries of administrator actions;

generating a graphical user interface that displays the candidate workflow; and storing the candidate workflow in a repository.

6. The computer system of claim 5, wherein constructing the candidate workflow for each group within the plurality of groups wherein each summary within each group associated with a high trustworthiness score is given greater weight than each summary associated with a low trustworthiness score.

7. The computer system of claim 5, wherein dividing the plurality of summaries into the plurality of groups of summaries is based on a plurality of similar corrective actions implemented by the system administrator to resolve the ticket associated with each summary.

8. The computer system of claim 5, wherein when constructing the candidate workflow, more weight is given to the at least one administrator action implemented in a majority of summaries within the plurality of groups of summaries.

9. A computer program product for creating a workflow using a plurality of system administrator actions to resolve at least one system issue, the computer program product comprising:

one or more computer-readable non-transitory tangible storage media and program instructions stored on at least one of the one or more non-transitory tangible storage media, the program instructions executable by a processor, the program instructions comprising:

program instructions to assign a plurality of tickets to at least one category based on the at least one system issue, wherein the at least one system issue is associated with each ticket;

program instructions to capture a first snapshot of a first system state associated with each machine associated with each ticket before a system administrator begins a corrective action on each machine;

program instructions to capture a second snapshot of a second system state associated with each machine after the system administrator completes the corrective action on each machine;

program instructions to create a difference set for each ticket, simultaneously, based on a comparison of the first snapshot of the first system state and the second snapshot of the second system state;

program instructions to assign a trustworthiness score to each difference set, wherein the trustworthiness score is based on a total number of tickets the system administrator previously resolved, a system administrator experience, a system administrator training, and a total number of tickets the system administrator previously resolved that were subsequently reopened due to reoccurrence of the at least one system issue;

program instructions to generate a plurality of summaries of at least one administrator action, simultaneously, wherein each summary is based on the difference set for each ticket and at least one command within at least one command history file and at least one state change caused by the at least one command, associated with each ticket in the at least one category;

program instructions to divide the plurality of summaries into a plurality of groups of summaries;

program instructions to construct a candidate workflow for each group within the plurality of groups, wherein constructing the candidate workflow utilizes n-gram analysis that accounts for an order of steps within each summary, and wherein, during construction of the candidate workflow, more weight is given to summaries of administrator actions generated using a difference set with a higher trustworthiness score than to summaries of administrator actions generated using a difference set with a lower trustworthiness score, and wherein steps within summaries of administrator actions implemented in a large number of summaries of administrator actions are given more weight when constructing the candidate workflow that steps in a small number of summaries of administrator actions;

program instructions to generate a graphical user interface that displays the candidate workflow; and program instructions to store the candidate workflow in a repository.

10. The computer program product of claim 9, wherein constructing the candidate workflow for each group within the plurality of groups wherein each summary within each group associated with a high trustworthiness score is given greater weight than each summary associated with a low trustworthiness score.

11. The computer program product of claim 9, wherein dividing the plurality of summaries into the plurality of groups of summaries is based on a plurality of similar corrective actions implemented by the system administrator to resolve the ticket associated with each summary.

* * * * *